United States Patent
Harvey et al.

(10) Patent No.: US 10,195,953 B2
(45) Date of Patent: Feb. 5, 2019

(54) CHARGING A LITHIUM BATTERY ON A UTILITY VEHICLE

(71) Applicant: Textron Innovations Inc., Providence, RI (US)

(72) Inventors: Arthur James Harvey, Beech Island, SC (US); Norman R. Padgett, Evans, GA (US); John Ledden, Augusta, GA (US)

(73) Assignee: Textron Innovations Inc., Providence, RI (US)

( * ) Notice: Subject to any disclaimer, the term of this patent is extended or adjusted under 35 U.S.C. 154(b) by 53 days.

(21) Appl. No.: 15/419,556

(22) Filed: Jan. 30, 2017

(65) Prior Publication Data

US 2018/0186244 A1    Jul. 5, 2018

Related U.S. Application Data

(60) Provisional application No. 62/440,595, filed on Dec. 30, 2016.

(51) Int. Cl.
*H02J 7/00*     (2006.01)
*B60L 11/18*    (2006.01)
(Continued)

(52) U.S. Cl.
CPC ............ *B60L 11/1824* (2013.01); *B60L 3/04* (2013.01); *B60L 3/12* (2013.01); *B60L 11/187* (2013.01);
(Continued)

(58) Field of Classification Search
CPC . B60L 11/1824; B60L 11/1861; H02J 7/0036; H02J 7/047; H02J 7/0091
(Continued)

(56) References Cited

U.S. PATENT DOCUMENTS 5,934,051 A    8/1999  Hahn
7,332,881 B2   2/2008  Clark et al.
(Continued)

FOREIGN PATENT DOCUMENTS

EP    1655830    5/2006
EP    2858202    4/2015
(Continued)

OTHER PUBLICATIONS

Garia, "Introducing the New Garia Golf", http://www.garia.com/news/introducing-the-new-garia-golf/, Sep. 15, 2016.
(Continued)

*Primary Examiner* — Paul Dinh
(74) *Attorney, Agent, or Firm* — BainwoodHuang

(57) ABSTRACT

A charging system charges a lithium battery of a utility vehicle. The charging system includes a receptacle configured to couple with an external charger, a lithium battery configured to provide lithium battery power to a set of electrical loads of the utility vehicle, and control circuitry coupled with the receptacle and the lithium battery. The control circuitry is configured to detect connection between the external charger and the receptacle and, in response to detecting connection between the external charger and the receptacle, ascertain a charging state of the lithium battery. The control circuitry is further configured to output, based on the charging state, a control signal to the external charger through the receptacle, the control signal being configured to control charging output from the external charger to charge the lithium battery.

20 Claims, 10 Drawing Sheets

(51) Int. Cl.
*B60L 3/04* (2006.01)
*B60L 3/12* (2006.01)

(52) U.S. Cl.
CPC ....... *B60L 11/1816* (2013.01); *B60L 11/1838* (2013.01); *B60L 11/1859* (2013.01); *B60L 11/1861* (2013.01); *B60L 11/1864* (2013.01); *H02J 7/0031* (2013.01); *H02J 7/0045* (2013.01); *H02J 7/0047* (2013.01); *B60L 2200/22* (2013.01); *B60L 2200/40* (2013.01); *B60L 2200/44* (2013.01); *B60L 2220/50* (2013.01); *B60L 2230/16* (2013.01); *B60L 2240/545* (2013.01); *B60L 2240/547* (2013.01); *B60L 2240/549* (2013.01); *B60L 2240/80* (2013.01); *H02J 7/0036* (2013.01)

(58) Field of Classification Search
USPC .......................................................... 320/109
See application file for complete search history.

(56) References Cited

U.S. PATENT DOCUMENTS

| | | | |
|---|---|---|---|
| 7,560,882 B2 | 7/2009 | Clark et al. | |
| 7,800,345 B2 | 9/2010 | Yun et al. | |
| 7,825,616 B2 | 11/2010 | Clark et al. | |
| D652,349 S | 1/2012 | Kristensen | |
| 8,120,291 B2 | 2/2012 | Clark et al. | |
| 8,596,391 B2 | 12/2013 | Kshatriya | |
| 8,604,749 B2 | 12/2013 | Kwag et al. | |
| 8,714,572 B1 | 5/2014 | Singletary et al. | |
| 9,050,899 B2 | 6/2015 | Seol | |
| 9,371,067 B2 | 6/2016 | Dao et al. | |
| 9,387,775 B2 | 7/2016 | Baek et al. | |
| 9,436,261 B2 | 9/2016 | Yun | |
| 9,508,982 B2 | 11/2016 | Kim et al. | |
| 9,553,460 B2 | 1/2017 | Dao et al. | |
| 9,592,743 B2 | 3/2017 | Haug | |
| 9,595,847 B2 | 3/2017 | Dao et al. | |
| 9,806,341 B2 | 10/2017 | Lee et al. | |
| 9,806,545 B2 | 10/2017 | Fink | |
| 2010/0123438 A1 | 5/2010 | Harada | |
| 2013/0088198 A1* | 4/2013 | Masuda | H02J 7/041 320/109 |
| 2013/0241502 A1 | 9/2013 | Sowden | |
| 2014/0002020 A1 | 1/2014 | Geber et al. | |
| 2014/0091764 A1 | 4/2014 | Kinomura et al. | |
| 2014/0225559 A1* | 8/2014 | Sugano | B60L 3/0046 320/108 |
| 2015/0130414 A1 | 5/2015 | Izumi | |
| 2016/0347302 A1 | 12/2016 | Niwa et al. | |

FOREIGN PATENT DOCUMENTS

| | | |
|---|---|---|
| EP | 3043417 | 7/2016 |
| WO | 20130024533 | 2/2013 |
| WO | 20130129217 | 9/2013 |
| WO | 20160133453 | 8/2016 |

OTHER PUBLICATIONS

Anonymous: "SAE Electric Vehicle and Plug in Hybrid Electric Vehicle Conductive Charge Coupler", SAE Standard, SAE International, US vol. J1772_201210, Oct. 15, 2012, pp. 1-93.

* cited by examiner

CHARGING A LITHIUM BATTERY ON A UTILITY VEHICLE

BACKGROUND

A conventional lithium-battery powered vehicle includes rechargeable lithium battery packs which discharge while energizing loads such as an electric motor of the vehicle. The lithium battery packs are then recharged from the electric grid.

To recharge the lithium battery packs, a human operator typically parks the vehicle next to a charging station, attaches a plug from the charging station to an electrical socket of the vehicle, and actuates a charge-enable switch that electrically connects the lithium battery packs to the electrical socket so that the lithium battery packs receive charge from the charging station through the electrical socket.

SUMMARY

It should be understood that there are deficiencies to the above-described conventional lithium-battery powered vehicle. For example, the human operator may forget to actuate the charge-enable switch after attaching the plug from the charging station to the electrical socket of the vehicle. Unfortunately, even though the human operator has parked the vehicle next to the charging station and attached the plug from the charging station to the electrical socket of the vehicle, the lithium battery packs do not charge without actuation of the charge-enable switch. Moreover, operation of the charge-enable switch may require the human operator to receive training as to when and when not to actuate the charge-enable switch, the proper plugging and switch actuating sequence, and so on.

Improved techniques are directed to charging a lithium battery of a utility vehicle where a human user is able to initiate charging by simply connecting an external charger to the utility vehicle. Such techniques do not require further human user input. Rather, the utility vehicle is able to automatically respond by conveying charge from the external charger to the lithium battery and disconnecting the lithium battery once the lithium battery is fully charged. Accordingly, the human user does not need to remember to actuate a charge-enable switch and does not need to receive special training on how to operate such a switch.

One embodiment is directed to a charging system for charging a lithium battery of a utility vehicle. The charging system includes a receptacle configured to couple with an external charger, a lithium battery configured to provide lithium battery power to a set of electrical loads of the utility vehicle, and control circuitry coupled with the receptacle and the lithium battery. The control circuitry is configured to detect connection between the external charger and the receptacle and, in response to detecting connection between the external charger and the receptacle, ascertain a charging state of the lithium battery. The control circuitry is further configured to output, based at least in part on the charging state, a control signal to the external charger through the receptacle, the control signal being configured to control charging output from the external charger to charge the lithium battery.

In some arrangements, the control circuitry includes a lithium battery management system (BMS) coupled with the lithium battery and the receptacle. The lithium BMS has a contactor configured to close to provide electrical access to the lithium battery and open to remove electrical access to the lithium battery.

In some arrangements, control circuitry further includes detection circuitry coupled with the lithium BMS. The detection circuitry is configured to detect connection between the external charger and the receptacle and, in response to detecting connection between the external charger and the receptacle, notify the lithium BMS that there is connection between the external charger and the receptacle.

In some arrangements, the detection circuitry is further configured to detect disconnection of the external charger from the receptacle and, in response to detecting disconnection of the external charger from the receptacle, notify the lithium BMS that the external charger is disconnected from the receptacle.

In some arrangements, the detection circuitry forms part of a motor controller of the utility vehicle. In these arrangements, the motor controller may be configured to control operation of an electric motor of the utility vehicle, and communicate with the lithium BMS through a controller area network (CAN) bus. Along these lines, the detection circuitry may be configured to periodically provide a first CAN message to the lithium BMS through the CAN bus to notify the lithium BMS that there is connection between the external charger and the receptacle, and provide a second CAN message to the lithium BMS through the CAN bus to notify the lithium BMS that the external charger is disconnected from the receptacle, the first CAN message being different from the second CAN message.

In some arrangements, the motor controller is configured to control power delivery to an electric brake of the utility vehicle. The electric brake is configured to (i) provide mechanical resistance which inhibits a motor of the utility vehicle from turning when the electric brake is unpowered and (ii) remove the mechanical resistance to allow the motor of the utility vehicle to turn when power is provided to the electric brake. Additionally, the detection circuitry is configured to prevent the motor controller from delivering power to the electric brake to keep the utility vehicle in place while there is connection between the external charger and the receptacle.

In some arrangements, the lithium battery includes a set of lithium cell modules. In these arrangements, the control circuitry is configured to receive a set of temperature measurements from the set of lithium cell modules, the set of temperature measurements identifying at least a portion of the charging state of the lithium battery. The control circuitry is further configured to provide the control signal further based on the set of temperature measurements.

Another embodiment is directed to a utility vehicle which includes a utility vehicle body, a set of electrical loads supported by the utility vehicle body, and a charging system supported by the utility vehicle body and coupled with the set of electrical loads. The charging system includes a receptacle configured to couple with an external charger, a lithium battery configured to provide lithium battery power to a set of electrical loads of the utility vehicle, and control circuitry coupled with the receptacle and the lithium battery. The control circuitry is configured to detect connection between the external charger and the receptacle and, in response to detecting connection between the external charger and the receptacle, ascertain a charging state of the lithium battery. The control circuitry is further configured to provide, based at least in part on the charging state, a control signal to the external charger through the receptacle, the control signal being configured to control charging output from the external charger to charge the lithium battery.

Yet another embodiment is directed to a method of charging a lithium battery which is performed by control circuitry of the utility vehicle. The method includes detecting connection between an external charger that is external to the utility vehicle and a receptacle of the utility vehicle and, in response to detecting connection between the external charger and the receptacle, ascertaining a charging state of the lithium battery. The method further includes, based at least in part on the charging state, outputting a control signal to the external charger through the receptacle, the control signal being configured to control charging output from the external charger to charge the lithium battery.

Other embodiments are directed to higher and lower level systems, assemblies, apparatus, processing circuits, etc. Some embodiments are directed to various processes, electronic components and circuitry which are involved in charging a lithium battery on a utility vehicle.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Overview

An improved technique is directed to charging a lithium battery of a utility vehicle where a human user is able to initiate charging by simply connecting an external charger to the utility vehicle. Such a technique does not require further human user input. Rather, the utility vehicle is able to respond by conveying electric charge from the external charger to the lithium battery and disconnecting the lithium battery once the lithium battery is fully charged. As a result and in contrast to conventional approaches which require an operator to actuate a charge-enable switch, the human user does not need to remember to actuate such a charge-enable switch and does not need to receive special training on how to operate such a switch.

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
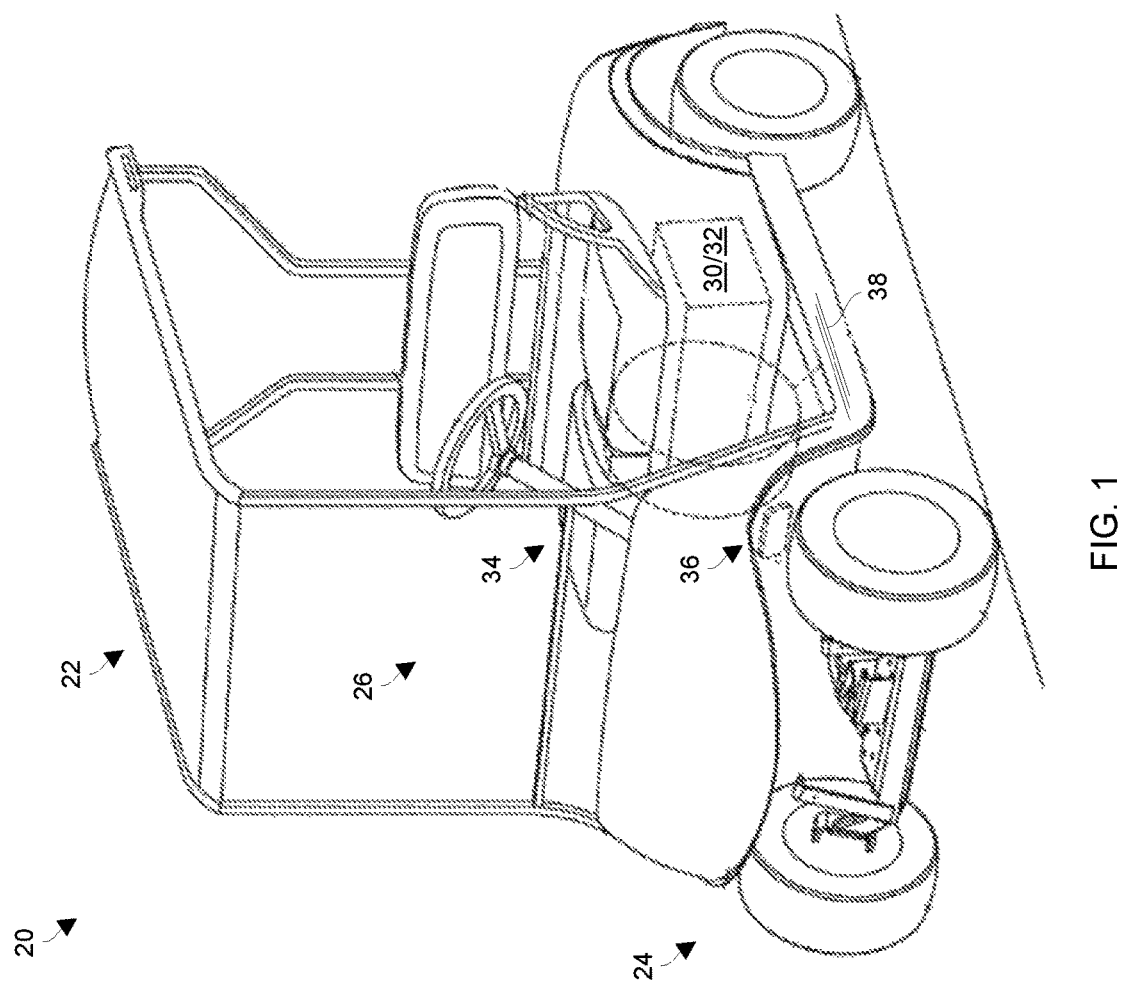
FIG. 1 is a perspective view of an example utility vehicle which controls electrical access to a lithium battery.

FIG. 1 shows an example utility vehicle 20 which controls electrical access to a lithium battery. The utility vehicle 20 includes a utility vehicle body 22 (e.g., a chassis, a frame, etc.), a set of tires (or wheels) 24, and a motion control system 26. It should be understood that the utility vehicle 20 has the form factor of a golf car by way of example only and that other form factors are suitable for use as well such as those of personal transport vehicles, food and beverage vehicles, hospitality vehicles, all-terrain vehicles (ATVs), utility task vehicles (UTVs), motorcycles, scooters, vehicles for specialized applications, as well as other lightweight vehicles and utility vehicles.

The motion control system 26 controls vehicle movement such as drive provided by the set of tires 24, speed control, braking, and so on thus enabling the utility vehicle 20 to perform useful work. The motion control system 26 of the illustrated embodiments includes, among other things, a motor system 30, a lithium battery system 32, and additional components 34 such as a set of user controls 36 (e.g., a foot pedal, a keyed switch, a maintenance switch, etc.) and cabling 38. As will be explained in further detail below, the utility vehicle 20 runs on power from a lithium battery and is equipped with a sleep/wakeup feature that automatically disconnects the lithium battery in response to certain timeout conditions thus preventing the lithium battery from further discharging. Further details will now be provided with reference to FIGS. 2 and 3.

Figure 2:
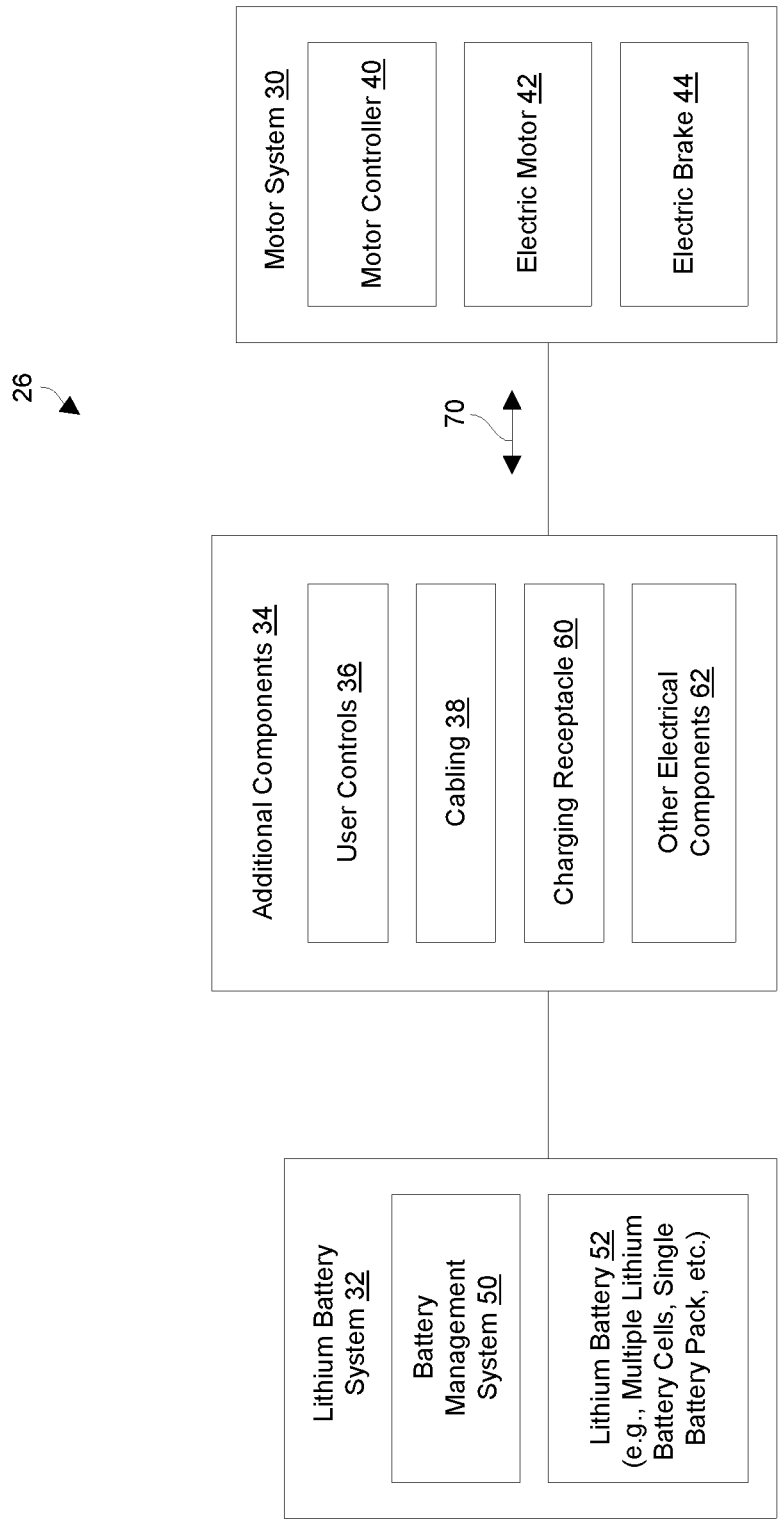
FIG. 2 is a block diagram of particular systems and components of the utility vehicle of FIG. 1 in accordance with some example embodiments.
Figure 3:
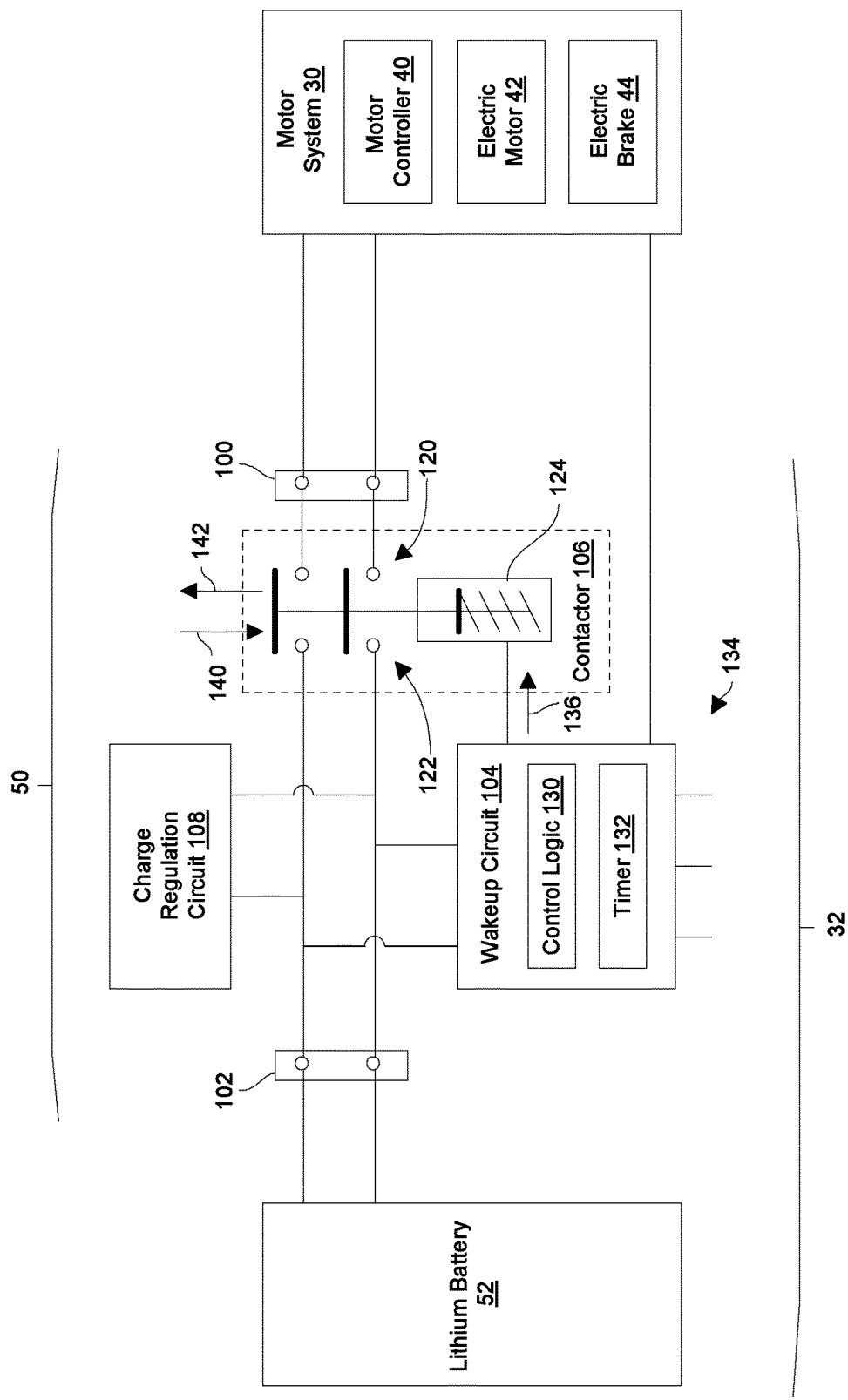
FIG. 3 is a block diagram of additional details of the utility vehicle of FIG. 1 in accordance with some example embodiments.

FIGS. 2 and 3 show particular details of the motion control system 26 of the utility vehicle 20 (FIG. 1) of some example embodiments. FIG. 2 shows certain general components of the motion control system 26 of some embodiments and how these components are related. FIG. 3 shows particular lower level details of the motion control system 26 in accordance with some embodiments.

As shown in FIG. 2, the motor system 30 includes a motor controller 40, an electric motor 42 which is linked to the set of tires 24 (FIG. 1), and an electric brake 44 coupled with the electric motor 42. The motor controller 40 of some embodiments controls delivery of stored electric power from the lithium battery system 32 to the electric motor 42 which ultimately turns at least some of the tires 24 to move the utility vehicle 20. Additionally, the motor controller 40 of some embodiments controls delivery of regenerative power from the electric motor 42 to recharge the lithium battery system 32 (e.g., during braking, while the utility vehicle 20 coasts downhill without any pedal depression, etc.).

The electric brake 44 is constructed and arranged to provide mechanical resistance which inhibits turning of the electric motor 42 when the electric brake 44 is unpowered, and remove the mechanical resistance to release the electric motor 42 thus allowing the electric motor 42 to turn when the electric brake 44 receives power. Accordingly, in some embodiments, when the utility vehicle 20 sits idle (i.e., the utility vehicle 20 is awake but a user is not pressing on the accelerator pedal, the utility vehicle 20 is turned off, etc.), the electric brake 44 remains engaged and the utility vehicle 20 sits in a parked state.

The lithium battery system 32 includes a battery management system (BMS) 50 and a lithium battery 52. The BMS 50 controls electrical access to the lithium battery 52. Additionally, as will be explained in further detail shortly, the BMS 50 of some embodiments responds to various events such as sleep events (e.g., timeouts) to prevent excessive discharging of the lithium battery 52 thus safeguarding the lithium battery 52 from becoming over discharged. In some embodiments, the BMS 50 responds to other events as well such as wakeup events (e.g., actuation of the user controls 36), charging situations, fault conditions, and so on to properly and safely control charging and discharging of the lithium battery 52.

It should be understood that a variety of form factors are suitable for the lithium battery 52. For example, the lithium battery 52 may include multiple lithium battery cells, a single battery pack, combinations thereof, and so on.

The additional components 34 may, for example, include the set of user controls 36 (e.g., pedals, switches, etc.), the cabling 38, a charging receptacle 60, and perhaps other electrical components 62 (e.g., lights, a global positioning system (GPS), specialized equipment, etc.). In some arrangements, the cabling 38 includes a communications bus, such as, for example, a controller area network (CAN) bus through which the motor system 30 and the lithium battery system 32 exchange communications 70 such as electronic CAN messages in accordance with the CAN protocol.

As shown in FIG. 3, in accordance with some example embodiments, the battery management system (BMS) 50 of the lithium battery system 32 includes a power delivery interface 100, a lithium battery interface 102, a wakeup circuit 104, a contactor 106, and a charge regulation circuit 108. These components may reside together as a single assembly or unit (e.g., within the same enclosure) or in a distributed manner among different locations on the utility vehicle body 22 (also see FIG. 1).

The power delivery interface 100 couples with the motor system 30. Similarly, the lithium battery interface 102 couples with the lithium battery 52. The wakeup circuit 104 controls closing and opening of the contactor 106 to electrically connect the motor system 30 to the lithium battery 52 and disconnect the motor system 30 from the lithium battery 52, respectively. During such operation, the charge regulation circuit 108 controls signal conditioning during discharging and charging of the lithium battery 52.

As further shown in FIG. 3, the contactor 106 includes a set of target contacts 120 that couple with the power delivery interface 100, a set of source contacts 122 that couple with the lithium battery interface 102, and an electromagnetic actuator 124. Although FIG. 3 shows the contactor 106 controlling two signal paths between the motor system 30 and the lithium battery 52 by way of example (i.e., there are two source contacts 122 and two target contacts 120), other arrangements include different numbers of contacts and signal paths (e.g., one, three, four, etc.) depending on the particular application/electrical needs/etc. (e.g., DC power signals at different voltages, AC power signals in different phases, ground, etc.).

The wakeup circuit 104 includes control logic 130 and a timer 132 which operate to manage access to the lithium battery 52. As will be explained in further detail shortly, such operation may be based on a variety of inputs 134 from the motor system 30, from the user controls 36 (directly or indirectly), and so on. Along these lines, in response to a wakeup event (e.g., a user turning on the BMS 50), the wakeup circuit 104 outputs an actuator signal 136 that actuates the electromagnetic actuator 124 in a first direction 140 from a first position to a second position that connects respective source contacts 122 to corresponding target contacts 120 to electrically connect the motor system 30 to the lithium battery 52. Along these lines, the electromagnetic actuator 124 may be provisioned with a solenoid or coil that closes the contactor 106 in response to the actuator signal 136.

Additionally, in response to a sleep event (e.g., encountering a predefined time period of non-use while the BMS 50 is awake), the wakeup circuit 104 terminates output of the actuator signal 136 which releases the electromagnetic actuator 124. In particular, the electromagnetic actuator 124 is spring biased in a second direction 142 which is opposite the first direction 140. Accordingly, termination of the actuator signal 136 enables the electromagnetic actuator 124 to return back from the second position to the first position thus automatically separating the source contacts 122 from the target contacts 120 when the wakeup circuit 104 terminates output of the actuation signal 136 thus disconnecting the motor system 30 from the lithium battery 52. As a result, there are no parasitic loads placed on the lithium battery 52 that could otherwise further discharge the lithium battery 52 to an over-depleted state.

In other embodiments, the wakeup circuit 104 does not need to constantly maintain the actuator signal 136. Instead, the wakeup circuit 104 controls engagement and disengagement of the contactor 106 using discrete engagement and disengagement signals. With such use of a dedicated release signal, maintenance of a signal and termination for release is not required.

Wakeup/Sleep

Figure 4:
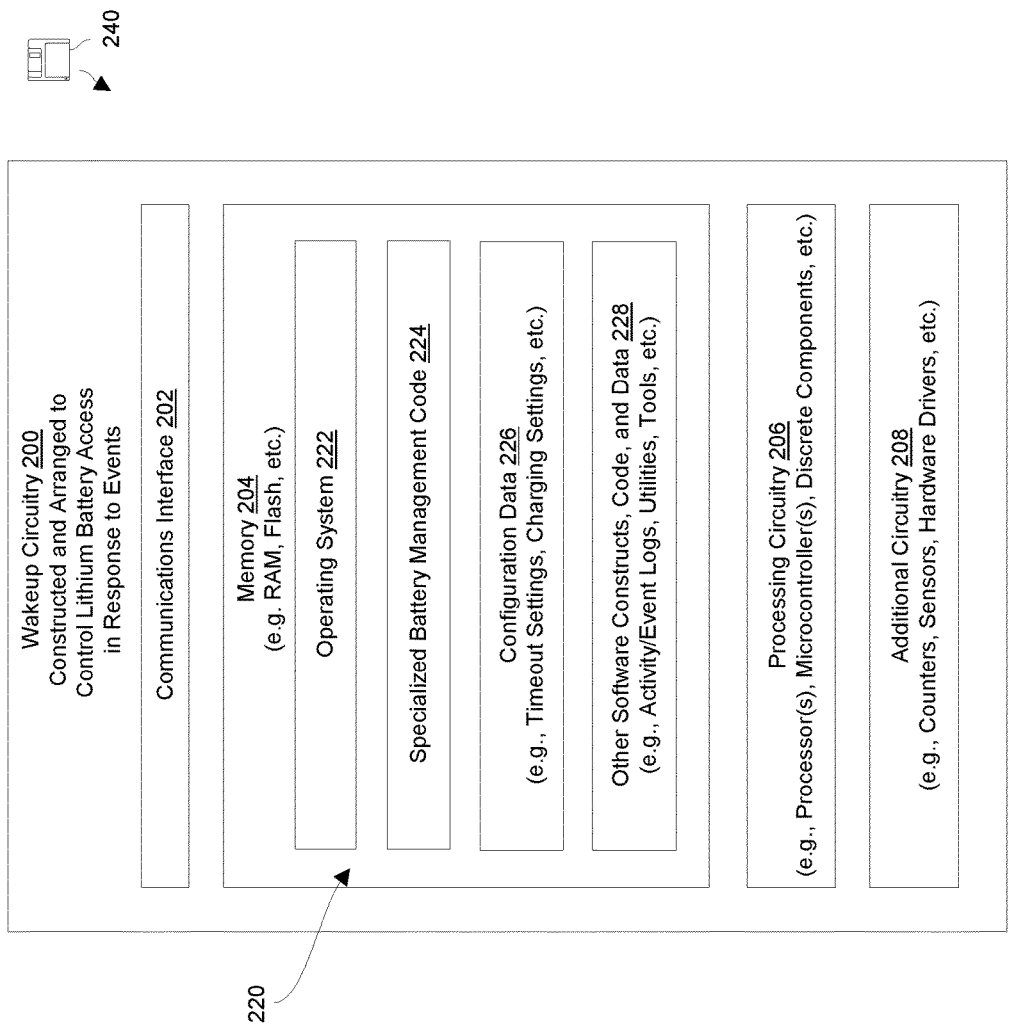
FIG. 4 is a block diagram of particular details of a wakeup circuit of a battery management system of the utility vehicle of FIG. 1 in accordance with some example embodiments.
Figure 5:
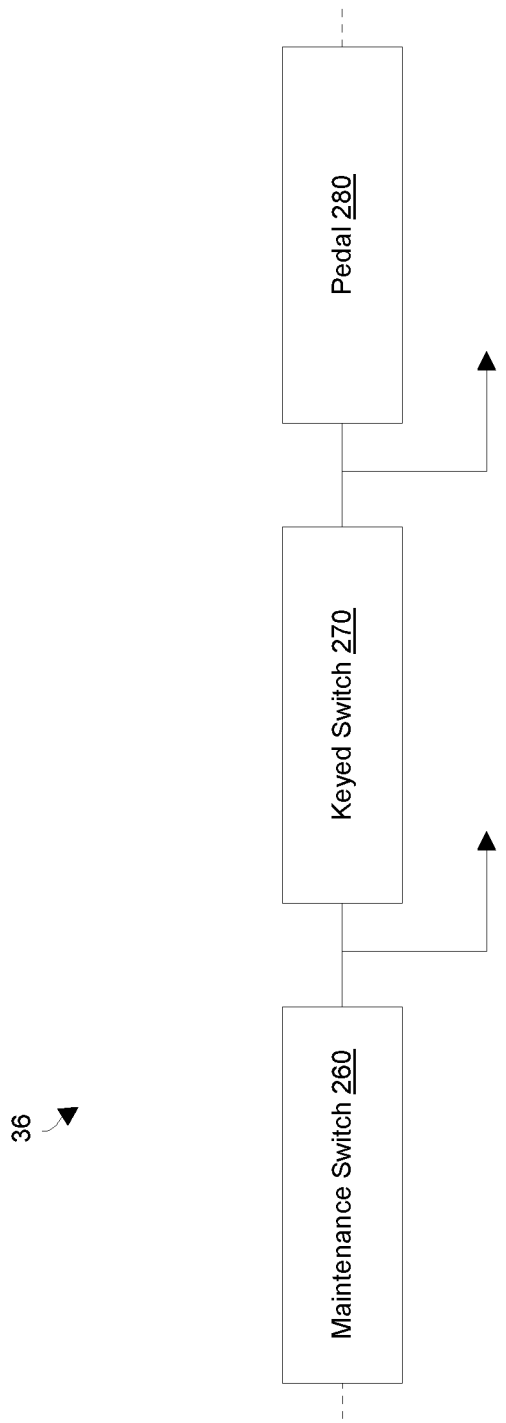
FIG. 5 is a block diagram of a first arrangement of particular user controls that provide input to the wakeup circuit of FIG. 4 in accordance with some example embodiments.
Figure 6:
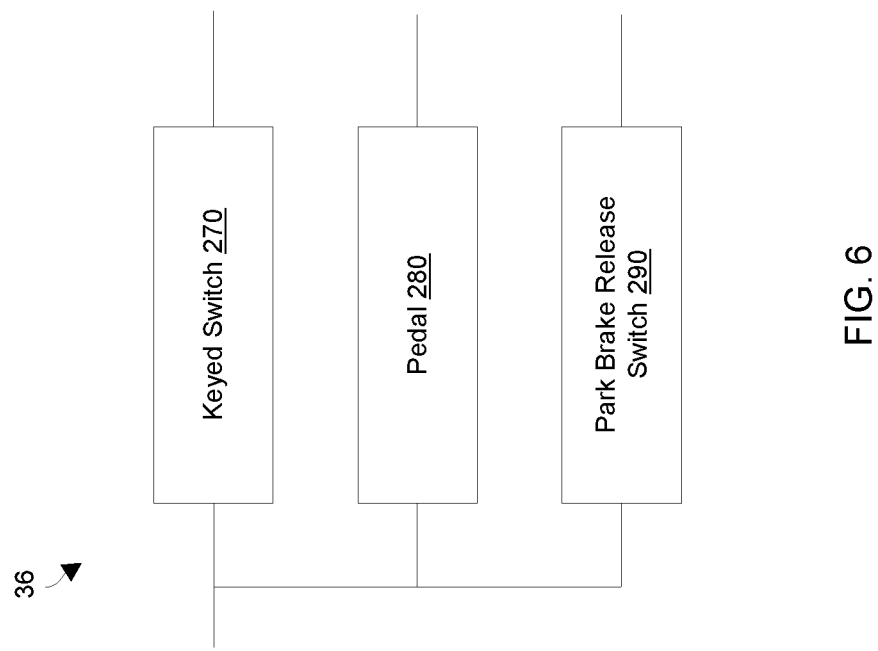
FIG. 6 is a block diagram of a second arrangement of particular user controls that provide input to the wakeup circuit of FIG. 4 in accordance with some example embodiments.

FIGS. 4 through 5 provide particular details of how the battery management system (BMS) 50 responds to wakeup and sleep events in accordance with some embodiments. FIG. 4 shows example details of wakeup circuitry 200 which is suitable for the wakeup circuit 104 (also see FIG. 3) in accordance with some embodiments. FIG. 5 shows a first arrangement of particular user controls 36 that couple with the inputs 134 and control operation of the wakeup circuit 104 (FIG. 3) in accordance with some embodiments. FIG. 6 shows a second arrangement of particular user controls 36 that couple with the inputs 134 and control operation of the wakeup circuit 104 (FIG. 3) in accordance with some embodiments.

As shown in FIG. 4, the wakeup circuitry 200 controls access to the lithium battery 52 (FIG. 3) in response to various events, situations, faults, etc. As shown in FIG. 4, the wakeup circuitry 200 includes, in an example embodiment, a communications interface 202, memory 204, processing circuitry 206, and additional circuitry 208. Such components form the control logic 130 and the timer 132 of the wakeup circuit 104 (FIG. 3).

The communications interface 202 is constructed and arranged to connect the wakeup circuitry 200 to one or more communications media such as a controller area network (CAN) bus (also see the cabling 38 in FIG. 1). Such communications may include different media such as copper-based (e.g., USB, RJ45, etc.), fiber optic communications, wireless communications (i.e., WiFi, cellular, Bluetooth, etc.), infrared, combinations thereof, and so on.

The memory 204 stores a variety of memory constructs 220 including an operating system 222, specialized battery management code 224, configuration data 226 (e.g., identification data, predefined timeout settings, charging settings, version data, model data, etc.), and other software constructs, code and data 228 (e.g., activity/event logs, utilities, tools, etc.). Although the memory 204 is illustrated as a single block in FIG. 4, the memory 204 is intended to represent both volatile and non-volatile storage (e.g., random access memory, flash memory, etc.), and may, in some embodiments, include a plurality of discrete physical memory units.

The processing circuitry 206 is configured to run in accordance with instructions of the various memory constructs 220 stored in the memory 204. In particular, the processing circuitry 206 runs the operating system 222 to manage various computerized resources (e.g., processor cycles, memory allocation, etc.). Additionally, the processing circuitry 206 runs the specialized battery management code 224 to electronically control access to the lithium battery 52 (FIGS. 2 and 3). The processing circuitry 66 may be implemented in a variety of ways including via one or more processors (or cores) running specialized software, application specific ICs (ASICs), field programmable gate arrays (FPGAs) and associated programs, microcontrollers, discrete components, analog circuits, other hardware circuitry, combinations thereof, and so on. In the context of one or more processors executing software, a computer program product 240 is capable of delivering all or portions of the software to the wakeup circuitry 200 (e.g., also see the memory constructs 220 in FIG. 4). The computer program product 240 has a non-transitory (or non-volatile) computer readable medium which stores a set of instructions which controls one or more operations of the wakeup circuitry 200. Examples of suitable computer readable storage media include tangible articles of manufacture and other apparatus which store instructions in a non-volatile manner such as flash memory, a magnetic storage medium (e.g., various disk memories such as a hard drive, floppy disk, or other magnetic storage medium), tape memory, optical disk (e.g., CD-ROM, DVD, Blu-Ray, or the like), and the like. It will be appreciated that various combinations of such computer readable storage media may be used to provide the computer readable medium of the computer program product 240 in some embodiments.

The additional circuitry 208 represents other circuitry of the wakeup circuitry 200. Such circuitry may include hardware counters, signal drivers, connectors, sensors, and so on.

In some arrangements, where the utility vehicle is specialized equipment (e.g., a food and beverage vehicle, an ATV, etc.) the additional circuitry 208 may represent other components such as an electronic thermostat, lighting control, and so on.

With reference to FIG. 5 and in accordance with some embodiments, a first arrangement of the user controls 36 includes a maintenance switch 260, a keyed switch 270, and an accelerator (or throttle) pedal 280 which are electrically connected in series to the other circuitry of the motion control system 26 (also see FIG. 2). Such user controls 36 may communicate with the BMS 50 via the inputs 134 (FIG. 3). Other user controls 36 may be electrically connected to the motion control system 26 as well such as a brake pedal, a forward/reverse switch, and so on. In some arrangements, one or more of the user controls 36 connect directly to the motor system 30 and input signals are sensed by the BMS 50 from the motor system 30.

With reference to FIG. 6 and in accordance with some embodiments, a second arrangement of the user controls 36 includes a keyed switch 270, and an accelerator (or throttle) pedal 280, and a park brake release switch 290 (e.g., a switch which energizes and releases an electric brake to enable towing) which are electrically connected in parallel to the BMS 50 (also see FIG. 2). Such user controls 36 may communicate with the BMS 50 via the inputs 134 (FIG. 3). Other user controls 36 may be electrically connected to the motion control system 26 as well such as a brake pedal, a forward/reverse switch, a tow switch which is different from the park brake release switch, and so on.

In some embodiments, the park brake release switch 290 is formed by an actual physical switching device that a user can move to different positions. In other embodiments, the park brake release switch 290 is formed by a set of jumpers (e.g., connectors, cables, etc.) that are switchable or arrangeable into different connecting configurations (e.g., a normal configuration, a tow configuration, etc.).

It should be understood the control logic 130 and the timer 132 of the wakeup circuit 104 (FIG. 3), which are formed by the wakeup circuitry 200 (FIG. 4), operate to monitor user activity of the utility vehicle 20 as well as transition the BMS 50 from a sleeping state to an awake state and vice versa. Further details of such operation will now be provided.

During operation, the wakeup circuit 104 monitors operation of the user controls 36 to determine whether to electrically connect the lithium battery 52 to the motor system 30 or electrically disconnect the lithium battery 52 from the motor system 30. For example, suppose that a human operator (or user) wishes to operate the utility vehicle 20 after an extended period of non-use such as a 24-hour period. In such a situation, the utility vehicle 20 is initially in a sleep (or unawake) mode or state in which the wakeup circuit 104 (FIG. 3) is completely unpowered and the contactor 106 is open (i.e., where there is no circuit formed between the lithium battery 52 and the motor system 30). Accordingly, there are no electrical loads on the lithium battery 52 that could otherwise drain charge from the lithium battery 52.

Further details of wakeup/sleep operation will now be provided with reference to some embodiments in connection with FIG. 5. Suppose that the user turns the maintenance switch 260 to an ON position (e.g., by simply transitioning the maintenance switch 260 from an OFF position to the ON position, by cycling the maintenance switch 260 from the ON position to the OFF position and back to the ON position, etc.). In such a situation, the wakeup circuit 104 of the BMS 50 turns on and responds by outputting the actuation signal 136 to close the contactor 106 (FIG. 3). As a result of such a wakeup event, the contactor 106 connects the source contacts 122 to the target contacts 120 thus connecting the lithium battery 52 to the motor system 30 and waking the motor system 30.

At this time and in accordance with some embodiments, both the BMS 50 and the motor system 30 perform various self-tests. For example, the BMS 50 checks the amount of charge remaining in the lithium battery 52 and, if the amount of charge is below a predefined minimum charge threshold, the BMS 50 terminates (e.g., immediately terminates) the actuation signal 136 to electrically disconnect the lithium battery 52 from the motor system 30. Such operation prevents the lithium battery 52 from becoming over-discharged. It should be understood that, while the BMS 50 remains awake, the BMS 50 continues to monitor charge remaining in the lithium battery 52 and terminates the actuation signal 136 to disconnect the lithium battery 52 from the motor system 30 if the remaining charge reaches (or falls below) the predefined minimum charge threshold to safeguard the battery against becoming over-discharged. In particular, there is still safety margin between the predefined minimum charge threshold and an over-discharged level.

In some embodiments, after passing their respective self-tests, the BMS 50 and the motor system 30 communicate with each other (e.g., exchange communications 70 such as CAN messages) to verify configuration information (e.g., model numbers, versions, status, etc.). In some arrangements, the motor system 30 may be one of multiple models and the wakeup circuit 104 operates using different configuration settings depending on the particular model identified via communications with the motor system 30.

Also, at this time, the control logic 130 of the wakeup circuit 104 starts the timer 132 (FIG. 3) which counts or tracks time until the timer 132 reaches a predefined idle time threshold (i.e., a maximum idle time limit). In accordance with some embodiments, example values that are suitable for use for the predefined idle time threshold include time amounts within the time range of 10 hours to 14 hours (e.g., 11 hours, 12 hours, 13 hours, etc.). In accordance with other embodiments, example values that are suitable for use for the predefined idle time threshold include time amounts within the time range of 2 hours to 6 hours (e.g., 3 hours, 4 hours, 5 hours, etc.). If the timer 132 counts from an initial time value to the predefined idle time threshold (a sleep event), the timer 132 outputs a sleep event signal to the control logic 130 of the wakeup circuit 104 which directs the control logic 130 to terminate output of the actuation signal 136 thus disconnecting the lithium battery 52 from the motor system 30. Such operation prevents the lithium battery 52 from unnecessarily succumbing to parasitic loads from the motor system 30, from the contactor 106 (i.e., the coil maintaining the contactor 106 in the closed position), and perhaps from elsewhere in the utility vehicle 20.

However, after BMS 50 has woken up, suppose that the user inserts a physical key into the keyed switch 270 and moves the keyed switch 270 from the OFF position to the ON position before the timer 132 reaches the predefined idle time threshold. In response to this sensed user activity, the control logic 130 restarts the timer 132 to the initial time value. Accordingly, the timer 132 is prevented from reaching the predefined idle time threshold and expiring.

Likewise, suppose that the user actuates the accelerator pedal 280 (e.g., moves the pedal 280 from its non-depressed position) before the timer 132 reaches the predefined idle time threshold. In response to this sensed user activity, the control logic 130 restarts the timer 132 to the initial time value. Again, the timer 132 is prevented from reaching the predefined idle time threshold and expiring. It should be understood that moving the accelerator pedal 280 may further signal the motor system 30 to operate the motor 42 (e.g., rotate the motor 42 in a particular direction and at a particular speed based on other factors).

However, if the user leaves the utility vehicle 20 unattended and the timer 132 reaches the predefined idle time threshold, the timer 132 expires (a sleep event) and sends a sleep event signal to the control logic 130. In response to the sleep event signal, the control logic 130 terminates output of the actuation signal 136 thus opening the contactor 106 to disconnect the lithium battery 52 from the motor system 30 (FIG. 3) and protecting the lithium battery 52 against further discharge.

In accordance with some embodiments, if the BMS 50 has fallen asleep and the maintenance switch 260 (FIG. 5) remains in the ON position, the user is able to wake the BMS 50 by moving the keyed switch 270 to the ON position (another wakeup event). Likewise, in accordance with some embodiments, if the BMS 50 has fallen asleep and the maintenance switch 260 and the keyed switch 270 are both in the ON position, the user is able to wake the BMS 50 by actuating the pedal 280 (yet another wakeup event).

In some embodiments and with reference to FIG. 5, the series configuration of the maintenance switch 260, the keyed switch 270, and the accelerator pedal 280 enables the maintenance switch 260 to disable sensing of the keyed switch 270 and the accelerator pedal 280. In particular, when the maintenance switch 260 is in the OFF position, the keyed switch 270 and the accelerator pedal 280 are unable to provide input to the control logic 130 of the wakeup circuit 104 thus preventing the user from waking up the BMS 50 via the keyed switch 270 or the pedal 280 while the maintenance switch 260 is in the OFF position.

Similarly, when the keyed switch 270 is in the OFF position, the accelerator pedal 280 is unable to provide input to the control logic 130 of the wakeup circuit 104. Accordingly, the user cannot wake up the BMS 50 simply by pushing on the accelerator pedal 280 while the keyed switch 270 is in the OFF position.

In some embodiments, while the maintenance switch 260 is in the ON position and the BMS 50 is awake, the motor system 30 and the BMS 50 operate to provide a walkaway protection feature that prevents the utility vehicle 20 from inadvertently rolling away at a high rate of speed. Along these lines, suppose that the user forgets to mechanically engage a brake to hold the utility vehicle 20 in place. If the utility vehicle 20 is perched on a hill and begins to roll, the motor system 30 senses that the utility vehicle 20 is moving but that the user is not pressing on the accelerator pedal 280. Accordingly, the motor system 30 of such embodiments provides proactive speed control and regenerative power. The proactive speed control maintains motor rotation at a low speed thus enabling the user to walk up to and stop the utility vehicle 20. Furthermore, the regenerative power recharges the lithium battery 52 thus improving efficiency.

Additional Details

Figure 7:
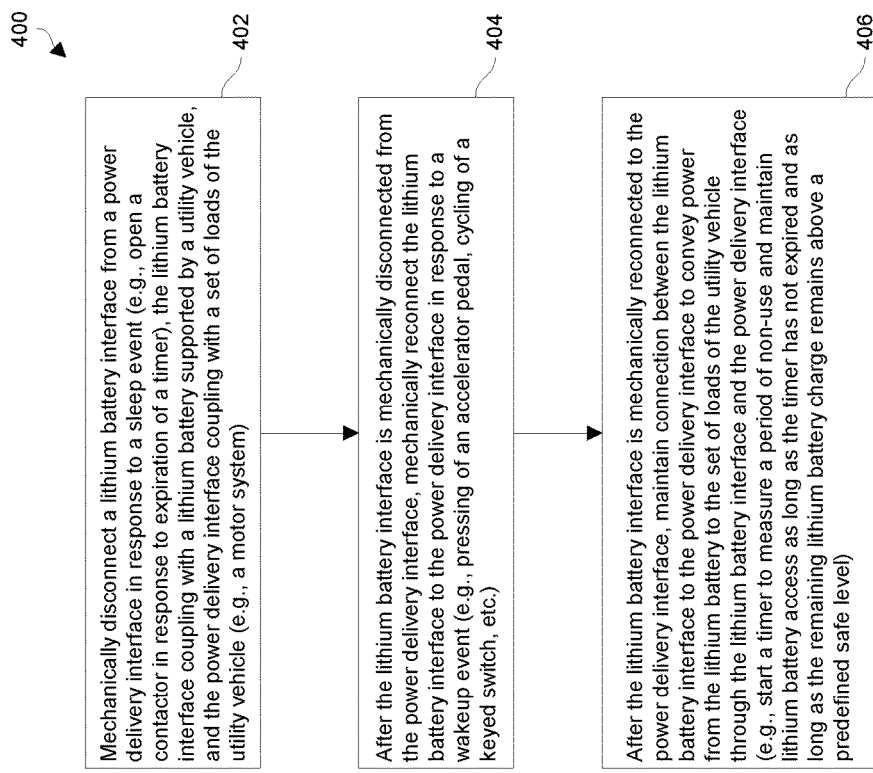
FIG. 7 is a flowchart of a procedure which is performed by the battery management system of the utility vehicle of FIG. 1 in accordance with some example embodiments.

FIG. 7 is a flowchart of a procedure 400 which is performed by the battery management system (BMS) 50 of the utility vehicle 20 to control access to the lithium battery 52 in accordance with some example embodiments.

At 402, the BMS 50 mechanically disconnects a lithium battery interface from a power delivery interface in response to a sleep event. The lithium battery interface couples with a lithium battery supported by the utility vehicle, and the power delivery interface couples with a set of loads of the utility vehicle. For example, a timer of the wakeup circuit may expire after a period of non-use thus indicating that the BMS 50 may disconnect the lithium battery 52 without interfering with a user of the utility vehicle 20. Such disconnection prevents parasitic loads from further draining the lithium battery 52.

At 404, after the lithium battery interface is mechanically disconnected from the power delivery interface, the BMS 50 mechanically reconnects the lithium battery interface to the power delivery interface in response to a wakeup event. For example, in accordance with some embodiments and in response to certain conditions, the user may press an accelerator pedal or cycle a keyed switch to wakeup the BMS 50.

At 406, after the lithium battery interface is mechanically reconnected to the power delivery interface, the BMS 50 maintains connection between the lithium battery interface and the power delivery interface to convey power from the lithium battery 52 to the set of loads of the utility vehicle through the lithium battery interface and the power delivery interface. In particular, the BMS 50 may start a timer to measure a period of non-use and maintain lithium battery access as long as the timer does not expire and as long as the lithium battery does not discharge below a predefined safe level.

As described above, improved techniques are directed to controlling electrical access to lithium batteries 52 on utility vehicles 20. Such techniques provide the ability to automatically disconnect the lithium batteries 52 from loads in response to timeout or sleep events. Such operation prevents the lithium batteries 52 from discharging even due to parasitic loads while the utility vehicles 20 are idle. Accordingly, the lithium batteries 52 will not discharge to unnecessarily low levels (e.g., safeguard levels). As a result, such operation robustly and reliably prevents the lithium batteries 52 from being recharged after being over-discharged and thus safeguards the lithium batteries 52 against becoming unstable.

Charging

Figure 8:
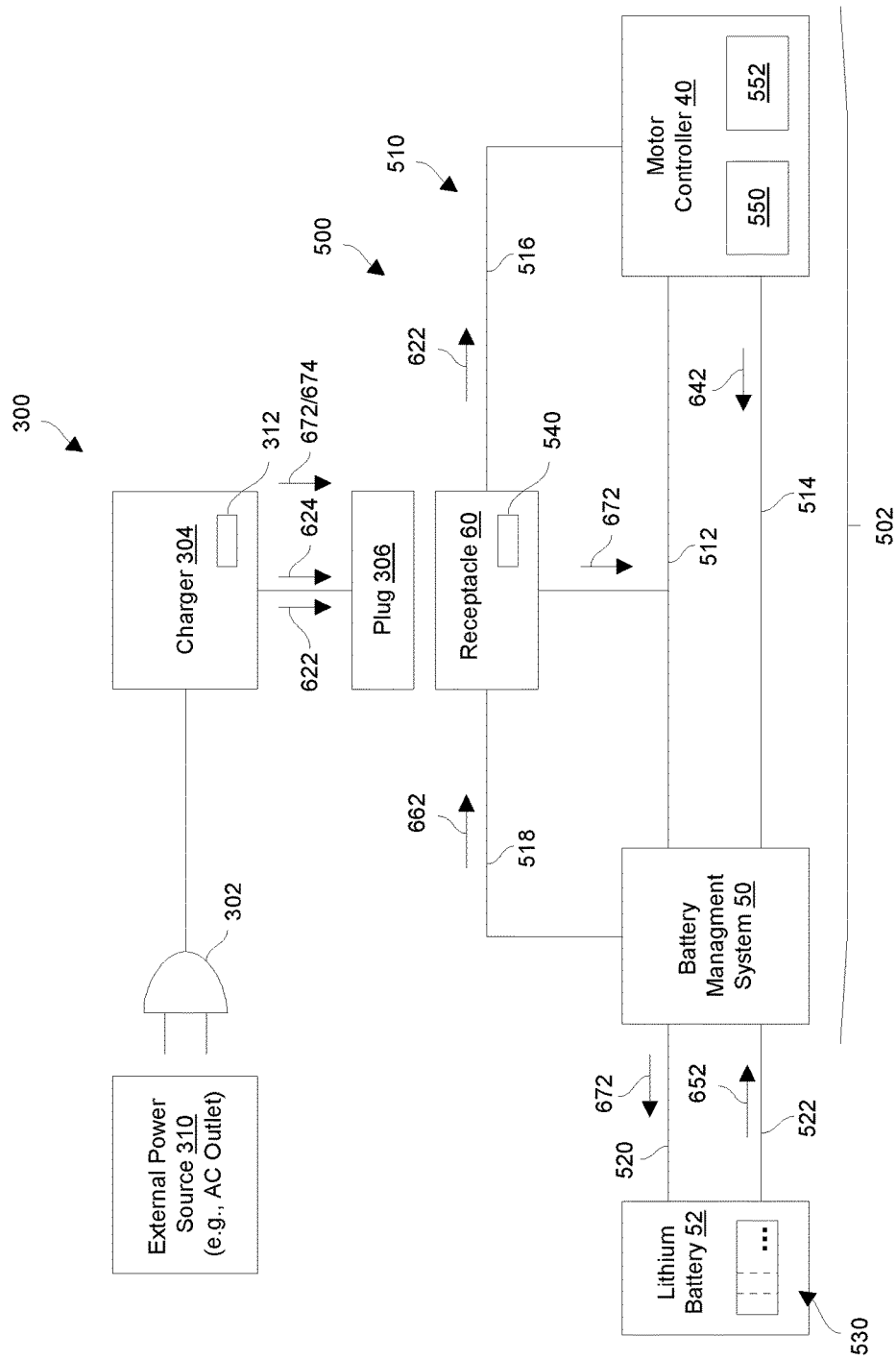
FIG. 8 is a block diagram of particular charging circuitry of the utility vehicle of FIG. 1 in accordance with some example embodiments.

FIG. 8 shows particular details of an external charger 300 and a charging system 500 of the utility vehicle 20. The external charger 300 includes a first plug 302, a charger (or adaptor) 304, and a second plug 306. The first plug 302 is constructed and arranged to connect the charger 304 to an external power source 310 such as an AC outlet. The second plug 306 is constructed and arranged to connect the charger 304 to the charging receptacle 60 of the utility vehicle 20 (also see FIG. 2). The charger 304 is constructed and arranged to convert and condition a power signal from the external power source 310 for use by the utility vehicle 20.

In some embodiments, the charger 304 includes a display 312 to display information to a user. Along these lines, the display 312 may include light emitting diodes (LEDs) of different colors (e.g., green, red, etc.).

As shown in FIG. 8 and in accordance with some embodiments, the charging system 500 of the utility vehicle 20 is formed by the receptacle 60, the lithium battery 52, and control circuitry 502. Furthermore, the control circuitry 502 is formed by the BMS 50 and at least a portion of the motor controller 40.

Although some of the connecting pathways may have been mentioned and/or illustrated earlier, the various components of the charging system 500 couple via a variety of pathways 510 (also see the cabling 38 in FIG. 1). In some embodiments, the receptacle 60 couples with the motor controller 40 and the BMS 50 via a power bus 512. In some embodiments, the motor controller 40 and the BMS 50 communicate over a communications bus 514. In some embodiments, the receptacle 60 further couples with motor controller 40 via an interlock signal pathway 516. In some embodiments, the receptacle 60 further couples with BMS 50 via a control signal pathway 518.

Additionally, in some embodiments, the BMS 50 couples with the lithium battery 52 via a power pathway 520, and a set of communications pathways 522. The power pathway 520 carries power to and from the lithium battery 52. The set of communications pathways 522 enables the BMS 50 to receive information (e.g., battery status such as voltage and temperature measurements) from the lithium battery 52.

As further shown in FIG. 8 and in accordance with some embodiments, the lithium battery 52 includes multiple lithium modules 530. Each lithium module 530 may include several lithium cells as well as circuitry to output individual status such as that module's minimum and maximum voltage, that module's minimum and maximum temperature, etc.

In some embodiments, the receptacle 60 includes a display 540 to indicate charging information to a user. In certain embodiments, the display 540 includes an LED that provides status to the user via different blinking or flashing patterns. In accordance with some embodiments, in response to different charging commands that the external charger 300 receives from the utility vehicle 20, the external charger 30 may flash or not flash the LED at different rates (e.g., a first speed to indicate charging at a normal rate, a second speed to indicate charging at a slow rate, and no flashing to indicate that the external charger 300 is not charging the lithium battery 52, etc.).

In some embodiments, the motor controller 40 includes detection circuitry 550 and electric brake control circuitry 552. The detection circuitry 550 is configured to detect connection between the external charger 300 and the receptacle 60 and convey such connection status to the BMS 50. The electric brake control circuitry 552 is configured to control power to the electric brake 44 (FIG. 2). Further charging details will be provided with reference to FIGS. 8 and 9.

Figure 9:
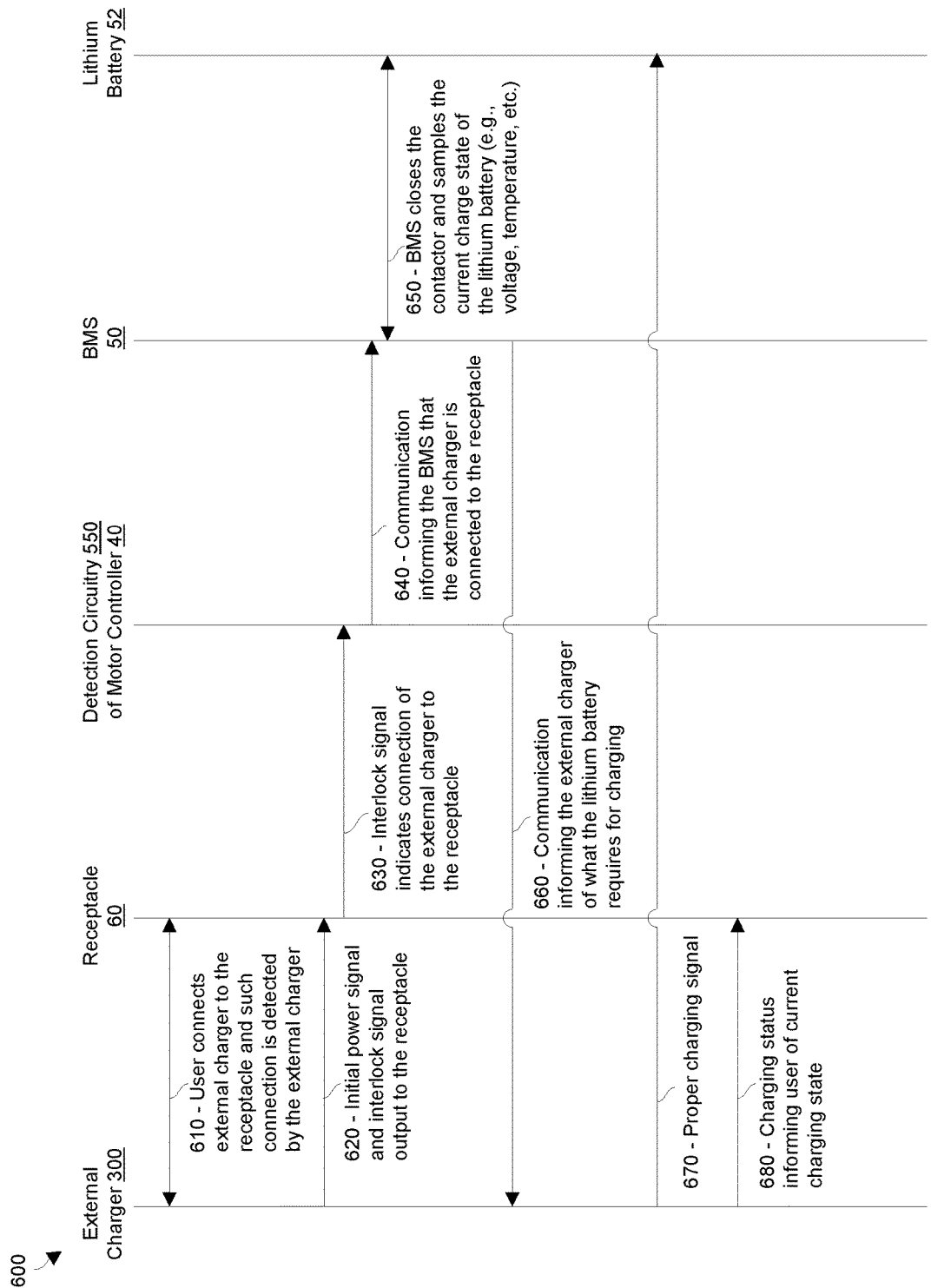
FIG. 9 is a sequence diagram illustrating particular charging activities that occur during lithium battery charging in accordance with some example embodiments.

FIG. 9 shows a sequence diagram 600 showing particular charging activities that occur during lithium battery charging in accordance with some embodiments. Suppose that a user wishes to charge the lithium battery 52 of the utility vehicle 20. In particular, the user may be ready to connect the external charger 300 to the receptacle 60 of the utility vehicle 20.

At 610, the user connects the external charger 300 to the receptacle 60 of the utility vehicle 20. In some embodiments, it does not matter whether the user plugs the external charger 300 into the external power source 310 (e.g., an AC outlet) before or after the user engages the plug 306 with the receptacle 60. Rather, the external charger 300 is considered properly connected to the receptacle 60 of the utility vehicle 20 once both events have occurred, i.e., the user has plugged the external charger 300 into the external power source 310 and the user engaged the plug 306 with the receptacle 60 (also see FIG. 8).

At 620, in response to the user plugging the external charger 300 into the external power source 310 and engaging the plug 306 with the receptacle 60, the external charger 300 outputs (i) an initial power signal 622 and (ii) an interlock signal 624 to the utility vehicle 20 (FIG. 8). In some embodiments, the initial power signal 622 is a temporary pulse (e.g., a 48 Volt power signal for a duration of six seconds). If the motor controller 40 and the BMS 50 are initially asleep, this initial power signal 622 wakes the motor controller 40 and the BMS 50 (e.g., the motor controller 40 and the BMS 50 power up and perform self-tests, the motor controller 40 and the BMS 50 perform sensing, etc.).

At 630, with the interlock signal 624 from the external charger 300 present at the receptacle 60 due to connection of the external charger 300 with the receptacle 60, the motor controller 40 detects the presence of the interlock signal 624 via the interlock signal pathway 516. In some embodiments, the detection circuitry 550 of the motor controller 40 tries to raise the interlock signal pathway 516 to a predefined voltage and a transistor in the receptacle 60 pulls that predefined voltage on the interlock signal pathway 516 low (e.g., to ground) in the absence of the external charger 300. When the user connects the external charger 300 to the receptacle 60, the transistor in the receptacle stops pulling the predefined voltage on the interlock signal pathway 516 low in response to the interlock signal 624 from the external charger 300. As a result, the detection circuitry 550 detects that the external charger 300 is connected to the receptacle 60.

At 640, in response to detecting connection of the external charger 300 with the receptacle 60, the control circuitry 550 of the motor controller 40 sends a communication 642 (FIG. 8) to the BMS 50 informing the BMS 50 that the external charger 300 is connected to the receptacle 60. In some embodiments, the communication 642 is a CAN message that the motor controller 40 sends to the BMS 50 the BMS 50 via a CAN bus (also see communications 70 in FIG. 2).

At 650, in response to the communication 642, the BMS 50 closes its contactor 106 (FIG. 3) and ascertains the current charge state of the lithium battery 52. In some embodiments, the BMS 50 routinely samples a current set of operating conditions 652 (FIG. 8) from the lithium battery 52 such as minimum and maximum voltage, minimum and maximum temperature, etc.

At 660, based at least in part on the current set of operating conditions 652, the BMS 50 provides a control signal 662 (FIG. 8) on the control signal pathway 518 to the external charger 60. In some embodiments, the control signal 662 informs the external charger 300 of what the lithium battery 52 requires for proper charging based on the condition of the lithium battery 52.

At 670, if the lithium battery 52 requires charging, the external charger 60 provides a proper power signal 672 (FIG. 8) to the lithium battery 52 based on the control signal 662. Additionally, in some embodiments and at 680, the external charger 60 provides a status signal 674 to the display 540 of the receptacle 60 to inform the user of the charging status (e.g., a slow blinking LED for a slow charge rate, a fast blinking LED for a normal charge rate, a solid LED for no charging due to the lithium battery being at full capacity, etc.). In some embodiments, the control signal 662, the interlock signal 624, and the status signal 674 are multiplexed through a cable connecting the charger 304 to the receptacle 60.

This above-described operation may continue until the lithium battery 52 is fully charged (e.g., repeating 630 through 670). In some embodiments, the BMS 50 is configured to routinely monitor the current charge state of the lithium battery 52 over time. If the BMS 50 determines that the lithium battery 52 requires different charging, the BMS 50 provides an appropriate control signal 662 to the external charger 300 directing the external charger to provide a proper power signal 672. It will be appreciated that such routine monitoring may encompass monitoring the current charge state of the lithium battery 52 over any of a variety of time intervals, including, for example, monitoring at various periodic intervals, monitoring at aperiodic intervals of varying time length, and/or in some embodiments, constant monitoring during one or more time periods. If the BMS 50 determines that the lithium battery 52 is fully charged, the BMS 50 provides an appropriate control signal 662 informing the external charger 300 to stop providing the power signal 672.

In some embodiments, the BMS 50 routinely samples, from all of the lithium modules 30, a current overall minimum voltage and a current overall maximum voltage. The BMS 50 compares these samples to a set of predefined voltage thresholds to determine whether the lithium battery 52 requires further charging or if the lithium battery 52 is fully charged. It will be appreciated that such routine sampling may encompass sampling over any of a variety of time intervals, including, for example, sampling at various periodic intervals, sampling at aperiodic intervals of varying time length, and/or in some embodiments, constant sampling during one or more time periods.

Additionally, in some embodiments, the BMS 50 routinely samples, a respective minimum temperature and a respective maximum temperature from each module 530. It will be appreciated that such routine sampling may encompass sampling over any of a variety of time intervals, including, for example, sampling at various periodic intervals, sampling at aperiodic intervals of varying time length, and/or in some embodiments, constant sampling during one or more time periods.

The BMS 50 further determines an overall current minimum temperature and an overall current maximum temperature for the lithium battery 52 as a whole from all of the respective module measurements. The BMS 50 compares these overall measurements to a set of predefined temperature thresholds to determine an appropriate rate of charge if any (also see the configuration data 226 in FIG. 4). For example, in accordance with some embodiments, the BMS 50 considers the lithium battery 52 ready to receive charging from the external charger 300 at a normal rate if the temperatures reside within a temperature range of 5 degrees Celsius to 45 degrees Celsius. Additionally, in accordance with some embodiments, the BMS 50 considers the lithium battery 52 ready to receive charging from the external charger 300 at a slow rate (i.e., a rate which is slower than the normal rate) if the temperatures reside within a suboptimal temperature range of −10 degrees Celsius to 5 degrees Celsius or within a suboptimal temperature range 45 degrees Celsius to 60 degrees Celsius (i.e., outside the range of 5 degrees Celsius to 45 degrees Celsius but within the range of −10 degrees Celsius to 60 degrees Celsius). Furthermore, in accordance with some embodiments, the BMS 50 considers the lithium battery 52 not ready to receive charging from the external charger 300 (i.e., a fault situation) if the temperatures reside outside the temperature range of −10 degrees Celsius to 60 degrees Celsius.

In some embodiments, the control signal 662 takes the form of a pulse width modulation (PWM) signal to imitate electrical behavior of a thermistor. Here, the BMS 50 outputs signals of different pulse widths to convey, as commands to the external charger 300, the different charging requirements of the lithium battery 52 (e.g., full, charge at a slow rate, charge at a normal rate, or fault).

In some embodiments, if the charging criteria changes over time and the external charger 300 updates the power signal 672, the external charger 300 also updates the status signal 674 to the display 540 of the receptacle 60. Accordingly, the user is able to identify whether the lithium battery 52 is charging and, if so, at what current rate.

When the BMS 50 informs the external charger 300 that the lithium battery 52 should not be charged, the external charger 300 terminates the power signal 672 and sets its display 312 accordingly. In some embodiments, when the BMS 50 informs the external charger 300 that the lithium battery 52 is fully charged, the external charger 300 terminates the power signal 672 and provides a visual indication (e.g., lights a green LED) to inform the user. In some embodiments, when the BMS 50 informs the external charger 300 that the lithium battery 52 should not be charged due to a fault condition (e.g., a temperature reading outside a predefined temperature range), the external charger 300 terminates the power signal 672 and provides a visual indication (e.g., lights a red LED) to inform the user.

In response to determining that the lithium battery 52 is fully charged, the BMS 50 notifies the external charger 300 and goes to sleep by opening the contactor 106 (FIG. 3). In some embodiments, the BMS 50 may remain awake for a short time after the lithium battery 52 is fully charged. Along these lines, the control logic 130 of the BMS 50 may use the timer 132 (FIG. 3) to monitor inactivity time and then go to sleep if there is no further sensed electronic activity by the utility vehicle 20 before the timer 132 times out. That is, in response to expiration of the timer 132, the BMS 50 opens the contactor 106 and goes to sleep.

It should be understood that the various timeout times imposed by the timer 132 may be of different lengths depending on the particular circumstances. For example, the amount of time used by the timer 132 to monitor inactivity after lithium battery charging may be different from the amount of time used by the timer 132 to monitor inactivity after other events such as after the user has cycled the keyed switch 270 and/or after the user has let up on the accelerator pedal 280 after driving the utility vehicle 20. In some embodiments, the timer 132 uses a shorter timeout period to monitor inactivity in response to the lithium battery 52 being charged to full capacity.

In some embodiments, the pull-down transistor feature of the receptacle 60 operates as a safeguard in the event that the receptacle 60 is damaged and disconnects from the motor controller 40. In such a situation, the detection circuitry 550 of the motor control 40 will detect a high signal on the interlock signal pathway 516 since the detection circuitry 550 raises the voltage to a predefined level and the transistor in the receptacle is unable to pull that signal down due to disconnection.

In some embodiments, when the detection circuitry 550 of the motor controller 40 detects connection between the external charger 300 and the receptacle 60 (e.g., due to the presence of the interlock signal 624 on the interlock signal pathway 516), the detection circuitry 550 directs the electric brake control circuitry 552 to prevent the electric brake 40 from energizing (also see FIG. 8). Accordingly, the utility vehicle 20 remains stationary. Further details will now be provided with reference to FIG. 10.

Figure 10:
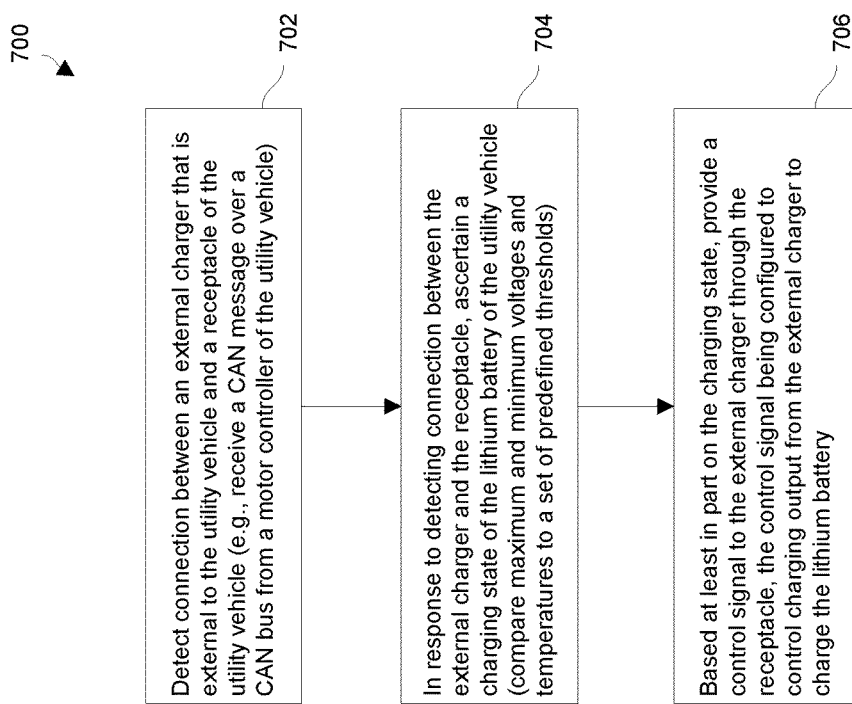
FIG. 10 is a flowchart of a procedure which is performed by circuitry of a utility vehicle during lithium battery charging in accordance with some example embodiments.

FIG. 10 is a flowchart of a procedure 700 which is performed by circuitry of a utility vehicle during lithium battery charging in accordance with some example embodiments. In some embodiments, the procedure 700 begins simply in response to a human user connecting an external charger to a receptacle of the utility vehicle.

At 702, the circuitry detects connection between an active external charger and a receptacle of the utility vehicle. In some embodiments, a motor controller of the utility vehicle provides a communication (e.g., a CAN message) to a BMS of the utility vehicle informing the BMS that the receptacle is connected to the external charger.

At 704, in response to detecting connection between the external charger and the receptacle, the circuitry ascertains a charging state of the lithium battery. In some embodiments, the circuitry samples maximum and minimum voltages and temperatures from individual lithium modules that form the lithium battery and compares these samples to a set of predefined thresholds to determine the current charging state of the lithium battery.

At 706, based at least in part on the charging state, the circuitry provides a control signal to the external charger through the receptacle. The control signal is configured to control charging output from the external charger to charge the lithium battery. In some embodiments, the external charger provides one of multiple different responses based on the control signal (e.g., terminate the charging signal due to the lithium battery being fully charged, provide a charge signal at a slow charge rate, provide a charge signal at a normal rate, terminate the charging signal due to a fault, etc.).

If the external charger is providing a charge signal to charge the lithium battery, the circuitry repeats 704 and 706. It will be appreciated that repetition of operations 704 and 706 may be performed at any of a variety of time intervals, including, for example, various periodic intervals, aperiodic intervals of varying time length, and/or in some embodiments, constant sampling during one or more time periods. As a result, the external charger continues to provide a charge signal and the lithium battery continues to charge.

When the lithium battery is fully charged, the circuitry detects this situation (e.g., based on monitoring the charging state of the lithium battery), and directs the external charger to terminate the charging signal. Additionally, the circuitry goes to sleep (e.g., after a short period of time) to prevent unnecessary discharging of the lithium battery.

As described above, improved techniques are directed to charging a lithium battery 52 of a utility vehicle 20 where a human user is able to initiate charging by simply connecting an external charger 300 to the utility vehicle 20. Such techniques do not require further human user input. Rather, the utility vehicle 20 is able to automatically respond by conveying charge from the external charger 300 to the lithium battery 52 and disconnecting the lithium battery 52 once the lithium battery 52 is fully charged. Accordingly, the human user does not need to remember to actuate a charge-enable switch and does not need to receive special training on how to operate such a switch.

While various embodiments of the present disclosure have been particularly shown and described, it will be understood by those skilled in the art that various changes in form and details may be made therein without departing from the spirit and scope of the present disclosure as defined by the appended claims.

In accordance with some embodiments, a charging system controls charging of a lithium battery powered car. Various features include charging initiation by plugging in charger only, dynamic charge rate adjustment based at least in part on battery temperature, and communication of status, control, and fault conditions between the BMS and charger.

In some embodiments, the components of the charging system include an off board battery charger, charger plug, charger receptacle, and BMS. The lithium battery couples with the BMS which disconnects the pack from the car when the car is not being used.

Conventional lithium battery powered vehicles require the operator to actuate a switch that tells the BMS to reconnect to the vehicle electrical system for charging. If the operator forgets to actuate the switch then the batteries won't charge.

However, in accordance with certain embodiments disclosed herein, the charge sequence is initiated by plugging the charger plug into the charge receptacle only. No other operator input is required. To accomplish this, the charger senses the plug being plugged into the receptacle. The charger then applies a 6 second, 48 volt pulse to power the entire vehicle electrical system. This wakes up the BMS and the motor controller.

In some embodiments, the BMS does not have a direct input from the charger or receptacle indicating whether the charger is plugged in. Rather, the motor controller senses that the charger is plugged in through an interlock signal from the receptacle. The motor controller sends a message (e.g., a CAN message) to the BMS that the charger is plugged in. When the BMS receives this signal it closes its contactor to reconnect the batteries to the vehicle electrical system. As long as this signal is valid, the BMS will remain connected. Charging can then take place.

For some lead acid battery powered vehicles, the lead acid battery charger uses a thermistor on the batteries to sense battery temperature. Battery temperature is used to adjust certain charge parameters in the charger. The thermistor is connected to the charge receptacle which multiplexed the thermistor reading, the receptacle LED control, and charger interlock signals onto a single wire to the charger. For the lithium batteries, the thermistor signal may be repurposed into a charge control signal. A transistor can be added to the BMS which imitates a thermistor by using pulse width modulation (PWM). In some embodiments, the PWM duty cycle is divided into 4 distinct levels that represent Charger Full, Charging Allowed at a Slow Rate, Charging Allowed at the Normal Rate, and Fault. In some embodiments, the BMS allows full charge rate within a normal range of battery cell temperatures (5 to 45 degrees C.). In some embodiments, the slow charge rate is allowed over a slightly wider cell temperature range (−10 to 5, and 45 to 60 degrees C.). No charging is allowed outside of the wide temperature range. The system dynamically adjusts charge rates based on temperature with no operator input. When charging is complete, the BMS signals Charger Full to the charger, which terminates charging. The charger responds to a fault signal by lighting a fault indicator LED on the charger.

In accordance with some embodiments, system components include the charger, charger plug, charger receptacle, BMS, motor controller, and vehicle switches. The BMS and the motor controller communicate over the CAN bus. In some embodiments, the BMS monitors the status of 3 switch inputs: key switch, pedal switch, and park brake release switch. In some embodiments, the motor controller monitors the status of a Run/Tow switch. In some embodiments, the BMS sends a PWM signal to the charger via the charger plug and receptacle. The receptacle drives a charger interlock signal that is monitored by the motor controller. An LED on the receptacle is controlled by the charger and indicates charge status. The LED, interlock, and PWM signals are all multiplexed onto a single wire from the charger to the charger plug and receptacle. Circuits inside the charger and receptacle encode and decode the signals. For lithium, a lead acid battery temperature signal was not needed and was replaced by the PWM signal which relays status information from the BMS to the charger.

In accordance with some embodiments, when the charger is plugged into the car, charging initiates regardless of whether the BMS is asleep or awake. If the BMS is awake, plugging in the charger asserts the charger interlock signal from the charge receptacle to the motor controller. In some embodiments, the motor controller informs the BMS that the charger is plugged in via a status bit in a message (e.g., a CAN message). The BMS then sets the PWM signal appropriately (when not charging, the BMS sets the PWM signal to the Fault mode as a failsafe). Charging can then take place. The BMS stays awake until charging is complete, and goes to sleep shortly after charging is complete. Accordingly, the BMS knows that the charger is plugged in and can monitor for fault and warning conditions. If the charger is plugged into a vehicle where the BMS is asleep, then the charger provides power to the vehicle's electrical system. This wakes up the BMS and the motor controller. If the BMS receives a message (e.g., a CAN message) from the motor controller with the charging status bit set, then it will close its contactor and set the PWM signal appropriately. Charging then commences.

Additionally, it should be understood that the keyed switch was described above as being used in certain example embodiments. It will be appreciated that the keyed switch is just one example of an ignition switch that may be used in various embodiments. For example, in other example embodiments, the vehicle uses a keyless, push-button ignition rather than a keyed switch. Such ignition is enabled when an "electronic key" (e.g., an RF device) on the passenger's person is within range of a wireless sensor of the vehicle. Here, an actuation of the switch occurs through presence of the electronic key in combination with physical actuation of the button.

Furthermore, in some embodiments, the BMS 50 utilizes an inactivity timer that measures inactivity time based on current (also see the timer 132 in FIG. 3). For example, the inactivity timer starts timing inactivity when current sensed from the lithium battery falls below a predefined current threshold (e.g., 3 amps). As long as the current remains below this predefined current threshold, the inactivity timer continues to measure time. However, if the current rises above the predefined current threshold, the inactivity timer is cleared (or reset) because this rise in current above the predefined current threshold is considered detected activity. The inactivity timer then starts counting again when current falls below the predefined current threshold. If the inactivity timer ever reaches a timeout value, the inactivity timer is considered to have expired (i.e., detected an inactivity timeout event). Such modifications and enhancements are intended to belong to various embodiments of the disclosure.

What is claimed is:

1. A charging system for charging a lithium battery of a utility vehicle, the charging system comprising:
    a receptacle configured to couple with an external charger;
    a lithium battery configured to provide lithium battery power to a set of electrical loads of the utility vehicle; and
    control circuitry coupled with the receptacle and the lithium battery, the control circuitry being configured to:
        detect connection between the external charger and the receptacle,
        in response to detecting connection between the external charger and the receptacle, ascertain a charging state of the lithium battery, and
        based at least in part on the charging state, provide a control signal to the external charger through the receptacle, the control signal being configured to control charging output from the external charger to charge the lithium battery;

wherein the control circuitry is further configured to:
detect a fully charged state of the lithium battery, and
in response to detecting the fully charged state of the lithium battery, provide, as the control signal, a command configured to (i) inform the external charger that the lithium battery is fully charged and (ii) direct the external charger to terminate charging;

wherein the control circuitry includes:
a lithium battery management system (BMS) coupled with the lithium battery and the receptacle, the lithium BMS having a contactor configured to close to provide electrical access to the lithium battery and open to remove electrical access to the lithium battery, the lithium BMS opening the contactor in response to detecting the fully charged state of the lithium battery;

wherein the lithium BMS includes:
an inactivity timer, and
control logic coupled with the timer and the contactor, the control logic being configured to (i) start the inactivity timer in response to the lithium BMS reaching the fully charged state and (ii) in response to expiration of the inactivity timer and in the absence of sensed electronic activity by the utility vehicle, open the contactor to remove electrical access to the lithium battery.

2. A charging system as in claim 1 wherein the control circuitry further includes:
detection circuitry coupled with the lithium BMS, the detection circuitry being configured to (i) detect connection between the external charger and the receptacle and (ii) in response to detecting connection between the external charger and the receptacle, notify the lithium BMS that there is connection between the external charger and the receptacle.

3. A charging system as in claim 2 wherein the detection circuitry is further configured to:
detect disconnection of the external charger from the receptacle, and
in response to detecting disconnection of the external charger from the receptacle, notify the lithium BMS that the external charger is disconnected from the receptacle.

4. A charging system as in claim 1 wherein the lithium battery includes a set of lithium cell modules; and
wherein the control circuitry is configured to:
receive a set of temperature measurements from the set of lithium cell modules, the set of temperature measurements identifying at least a portion of the charging state of the lithium battery, and
provide the control signal further based on the set of temperature measurements.

5. A charging system as in claim 1 wherein the utility vehicle includes a vehicle body; and
wherein the receptacle, the lithium battery, and the control circuitry are part of the utility vehicle and are supported by the vehicle body.

6. A charging system as in claim 1 wherein the contactor is part of the utility vehicle and is separate from the external charger.

7. A charging system as in claim 1 wherein the control circuitry is part of the utility vehicle and is interconnected between the receptacle and the lithium battery.

8. A charging system as in claim 1 wherein the utility vehicle includes a vehicle body;
wherein the receptacle, the lithium battery, and the control circuitry are part of the utility vehicle and are supported by the vehicle body;
wherein the contactor is part of the utility vehicle and is external to the external charger; and
wherein the control circuitry is part of the utility vehicle and is interconnected between the receptacle and the lithium battery.

9. A charging system for charging a lithium battery of a utility vehicle, the charging system comprising:
a receptacle configured to couple with an external charger;
a lithium battery configured to provide lithium battery power to a set of electrical loads of the utility vehicle; and
control circuitry coupled with the receptacle and the lithium battery, the control circuitry being configured to:
detect connection between the external charger and the receptacle,
in response to detecting connection between the external charger and the receptacle, ascertain a charging state of the lithium battery, and
based at least in part on the charging state, provide a control signal to the external charger through the receptacle, the control signal being configured to control charging output from the external charger to charge the lithium battery;

wherein the control circuitry includes:
a lithium battery management system (BMS) coupled with the lithium battery and the receptacle, the lithium BMS having a contactor configured to close to provide electrical access to the lithium battery and open to remove electrical access to the lithium battery;

wherein the control circuitry further includes:
detection circuitry coupled with the lithium BMS, the detection circuitry being configured to (i) detect connection between the external charger and the receptacle and (ii) in response to detecting connection between the external charger and the receptacle, notify the lithium BMS that there is connection between the external charger and the receptacle;

wherein the detection circuitry is further configured to:
detect disconnection of the external charger from the receptacle, and
in response to detecting disconnection of the external charger from the receptacle, notify the lithium BMS that the external charger is disconnected from the receptacle;

wherein the detection circuitry forms part of a motor controller of the utility vehicle, the motor controller being configured to:
control operation of an electric motor of the utility vehicle, and
communicate with the lithium BMS through a controller area network (CAN) bus; and wherein the detection circuitry is configured to:
provide on multiple instances, while the external charger is connected with the receptacle, a first CAN message to the lithium BMS through the CAN bus to notify the lithium BMS that there is connection between the external charger and the receptacle, and
provide a second CAN message to the lithium BMS through the CAN bus to notify the lithium BMS that the external charger is disconnected from the receptacle, the first CAN message being different from the second CAN message.

10. A charging system for charging a lithium battery of a utility vehicle, the charging system comprising:
a receptacle configured to couple with an external charger;
a lithium battery configured to provide lithium battery power to a set of electrical loads of the utility vehicle; and
control circuitry coupled with the receptacle and the lithium battery, the control circuitry being configured to:
detect connection between the external charger and the receptacle,
in response to detecting connection between the external charger and the receptacle, ascertain a charging state of the lithium battery, and
based at least in part on the charging state, provide a control signal to the external charger through the receptacle, the control signal being configured to control charging output from the external charger to charge the lithium battery;
wherein the control circuitry includes:
a lithium battery management system (BMS) coupled with the lithium battery and the receptacle, the lithium BMS having a contactor configured to close to provide electrical access to the lithium battery and open to remove electrical access to the lithium battery;
wherein the control circuitry further includes:
detection circuitry coupled with the lithium BMS, the detection circuitry being configured to (i) detect connection between the external charger and the receptacle and (ii) in response to detecting connection between the external charger and the receptacle, notify the lithium BMS that there is connection between the external charger and the receptacle;
wherein the detection circuitry is further configured to:
detect disconnection of the external charger from the receptacle, and
in response to detecting disconnection of the external charger from the receptacle, notify the lithium BMS that the external charger is disconnected from the receptacle;
wherein the motor controller is configured to control power delivery to an electric brake of the utility vehicle, the electric brake being configured to (i) provide mechanical resistance which inhibits a motor of the utility vehicle from turning when the electric brake is unpowered and (ii) remove the mechanical resistance to allow the motor of the utility vehicle to turn when power is provided to the electric brake; and
wherein the detection circuitry is configured to prevent the motor controller from delivering power to the electric brake to keep the utility vehicle in place while there is connection between the external charger and the receptacle.

11. A charging system for charging a lithium battery of a utility vehicle, the charging system comprising:
a receptacle configured to couple with an external charger;
a lithium battery configured to provide lithium battery power to a set of electrical loads of the utility vehicle; and
control circuitry coupled with the receptacle and the lithium battery, the control circuitry being configured to:
detect connection between the external charger and the receptacle,
in response to detecting connection between the external charger and the receptacle, ascertain a charging state of the lithium battery, and
based at least in part on the charging state, provide a control signal to the external charger through the receptacle, the control signal being configured to control charging output from the external charger to charge the lithium battery;
wherein the lithium battery includes a set of lithium cell modules;
wherein the control circuitry is configured to:
receive a set of temperature measurements from the set of lithium cell modules, the set of temperature measurements identifying at least a portion of the charging state of the lithium battery, and
provide the control signal further based on the set of temperature measurements; and
wherein the control circuitry, when providing the control signal further based on the set of temperature measurements, is configured to:
receive, as a current set of measurements, a minimum temperature measurement and a maximum temperature measurement from each lithium cell module,
identify an overall minimum temperature measurement and an overall maximum temperature measurement from the current set of measurements, and
provide, as the control signal, (i) a first command when the overall minimum temperature measurement and the overall maximum temperature measurement are within a predefined normal temperature range, and (ii) another command that is different from the first command when at least one of the overall minimum temperature measurement and the overall maximum temperature measurement falls outside the predefined normal temperature range.

12. A charging system as in claim 11 wherein the control circuitry, when providing the other command that is different from the first command, is configured to:
provide, as the other command, (i) a second command when the overall minimum temperature measurement and the overall maximum temperature measurement are within a predefined suboptimal temperature range which is outside the predefined normal temperature range, and (ii) third command when at least one of the overall minimum temperature measurement and the overall maximum temperature measurement falls outside the predefined suboptimal temperature range.

13. A charging system as in claim 12 wherein the first command is configured to direct the external charger to charge the lithium battery at a normal rate;
wherein the second command is configured to direct the external charger to charge the lithium battery at a slow rate which is slower than the normal rate; and
wherein the third command is configured to direct the external charger to not charge the lithium battery.

14. A charging system as in claim 13 wherein each of the first command, the second command, and the third command is a different pulse width modulation (PWM) signal to imitate electrical behavior of a thermistor.

15. A charging system as in claim 12 wherein the first command is further configured to direct the external charger to flash a light emitting diode (LED) of the receptacle at a first speed to indicate charging at the normal rate;
wherein the second command is further configured to direct the external charger to flash the LED of the receptacle at a second speed which is different from the first speed to indicate charging at the slow rate;

wherein the third command is further configured to direct the external charger not to flash the LED to indicate that the charger is not charging the lithium battery.

16. A utility vehicle, comprising:
a utility vehicle body;
a set of electrical loads supported by the utility vehicle body; and
a charging system supported by the utility vehicle body and coupled with the set of electrical loads, the charging system including:
  a receptacle configured to couple with an external charger,
  a lithium battery configured to provide lithium battery power to the set of electrical loads, and
  control circuitry coupled with the receptacle and the lithium battery, the control circuitry being configured to:
    detect connection between the external charger and the receptacle,
    in response to detecting connection between the external charger and the receptacle, ascertain a charging state of the lithium battery, and
    based at least in part on the charging state, output a control signal to the external charger through the receptacle, the control signal being configured to control charging output from the external charger to charge the lithium battery;
  wherein the control circuitry is further configured to:
    detect a fully charged state of the lithium battery, and
    in response to detecting the fully charged state of the lithium battery, provide, as the control signal, a command configured to (i) inform the external charger that the lithium battery is fully charged and (ii) direct the external charger to terminate charging;
  wherein the control circuitry includes:
    a lithium battery management system (BMS) coupled with the lithium battery and the receptacle, the lithium BMS having a contactor configured to close to provide electrical access to the lithium battery and open to remove electrical access to the lithium battery, the lithium BMS opening the contactor in response to detecting the fully charged state of the lithium battery;
  wherein the lithium BMS includes:
    an inactivity timer, and
    control logic coupled with the timer and the contactor, the control logic being configured to (i) start the inactivity timer in response to the lithium BMS reaching the fully charged state and (ii) in response to expiration of the inactivity timer and in the absence of sensed electronic activity by the utility vehicle, open the contactor to remove electrical access to the lithium battery.

17. A utility vehicle as in claim 16 wherein the contactor is separate from and external to the external charger.

18. A utility vehicle as in claim 16 wherein the control circuitry is interconnected between the receptacle and the lithium battery.

19. In a utility vehicle, a method of charging a lithium battery, the method comprising:
  detecting, by control circuitry of the utility vehicle, connection between an external charger that is external to the utility vehicle and a receptacle of the utility vehicle,
  in response to detecting connection between the external charger and the receptacle, ascertaining, by the control circuitry, a charging state of the lithium battery,
  based at least in part on the charging state, providing, by the control circuitry, a control signal to the external charger through the receptacle, the control signal being configured to control charging output from the external charger to charge the lithium battery;
  detecting, by the control circuitry, a fully charged state of the lithium battery, and
  in response to detecting the fully charged state of the lithium battery, providing, as the control signal and by the control circuitry, a command configured to (i) inform the external charger that the lithium battery is fully charged and (ii) direct the external charger to terminate charging;
  wherein the control circuitry includes:
    a lithium battery management system (BMS) coupled with the lithium battery and the receptacle, the lithium BMS having a contactor configured to close to provide electrical access to the lithium battery and open to remove electrical access to the lithium battery, the lithium BMS opening the contactor in response to detecting the fully charged state of the lithium battery;
  wherein the lithium BMS includes:
    an inactivity timer, and
    control logic coupled with the timer and the contactor, the control logic being configured to (i) start the inactivity timer in response to the lithium BMS reaching the fully charged state and (ii) in response to expiration of the inactivity timer and in the absence of sensed electronic activity by the utility vehicle, open the contactor to remove electrical access to the lithium battery.

20. A method as in claim 19 wherein detecting the connection between the external charger that is external to the utility vehicle and the receptacle of the utility vehicle includes:
  receiving, by the lithium battery management system (BMS) of the control circuitry, a communication from a motor controller of the control circuitry, the motor controller being configured to operate a motor of the utility vehicle, and the communication indicating that the external charger is connected to the receptacle.

* * * * *